(12) United States Patent
Yeh

(10) Patent No.: US 11,021,110 B1
(45) Date of Patent: Jun. 1, 2021

(54) APPARATUS FOR TYING A BOARD TO A VEHICLE ROOF

(71) Applicant: Tzong In Yeh, Dana Point, CA (US)

(72) Inventor: Tzong In Yeh, Dana Point, CA (US)

( * ) Notice: Subject to any disclaimer, the term of this patent is extended or adjusted under 35 U.S.C. 154(b) by 0 days.

(21) Appl. No.: 16/751,106

(22) Filed: Jan. 23, 2020

(30) Foreign Application Priority Data

Dec. 12, 2019 (TW) ................................. 108145604

(51) Int. Cl.
  *B60R 9/048* (2006.01)
  *B60R 9/058* (2006.01)
  *B60R 9/08* (2006.01)

(52) U.S. Cl.
  CPC .............. *B60R 9/048* (2013.01); *B60R 9/058* (2013.01); *B60R 9/08* (2013.01)

(58) Field of Classification Search
  CPC ............ B60R 9/048; B60R 9/058; B60R 9/08
  See application file for complete search history.

(56) References Cited

U.S. PATENT DOCUMENTS

| | | | | |
|---|---|---|---|---|
| 4,007,862 A * | 2/1977 | Heftmann | ................. | B60R 9/08 224/329 |
| 4,402,442 A * | 9/1983 | Martino | .................... | B60R 9/08 224/324 |
| 5,067,644 A * | 11/1991 | Coleman | ................. | B60R 9/048 224/324 |
| 5,769,291 A * | 6/1998 | Chasan | .................... | B63B 32/87 224/324 |
| 5,947,354 A * | 9/1999 | Williams | .................. | B60R 9/04 224/318 |
| 6,199,412 B1 * | 3/2001 | Kennedy | ................. | A44B 11/14 224/568 |
| 7,407,353 B2 * | 8/2008 | George | ................. | B60P 7/0869 410/41 |
| 8,517,237 B1 * | 8/2013 | Barber | ...................... | B60R 9/05 224/316 |
| 10,206,461 B1 * | 2/2019 | Swetish | ............. | A44B 17/0076 |
| 2005/0199665 A1 * | 9/2005 | Plzak | ...................... | B60R 9/058 224/318 |
| 2010/0127026 A1 * | 5/2010 | Rhodes | ..................... | B60R 9/04 224/318 |
| 2011/0297713 A1 * | 12/2011 | Gisin | ........................ | B60R 9/12 224/327 |

\* cited by examiner

*Primary Examiner* — Corey N Skurdal
(74) *Attorney, Agent, or Firm* — Muncy, Geissler, Olds & Lowe, P.C.

(57) ABSTRACT

A tying apparatus includes a padding assembly and a binding assembly. The padding assembly is located on a vehicle roof. The binding assembly is operable to tie an object supported on the padding assembly to the vehicle roof. The binding assembly includes a strap and a buckle. The strap is operable to form a loop. The buckle is operable to keep the strap in the form of the loop.

10 Claims, 7 Drawing Sheets

APPARATUS FOR TYING A BOARD TO A VEHICLE ROOF

BACKGROUND OF INVENTION

1. Field of Invention

The present invention relates to a board and, more particularly, to an apparatus for tying a board such as a surfboard and a paddleboard to a vehicle roof.

2. Related Prior Art

A vehicle can be equipped with a roof rack to carry a sports board such as a surfboard, a paddleboard, a snowboard, a grass board and sand board, particular a large sports board such as a surfboard and a paddleboard. However, it is troublesome to firmly place such a sports board on such a roof rack.

The present invention is therefore intended to obviate or at least alleviate the problems encountered in prior art.

SUMMARY OF INVENTION

It is the primary objective of the present invention to provide a convenient and reliable tying apparatus.

To achieve the foregoing objective, the tying apparatus includes a padding assembly and a binding assembly. The padding assembly is located on a vehicle roof. The binding assembly is operable to tie an object supported on the padding assembly to the vehicle roof.

In an aspect, the tying apparatus includes soft skins respectively connected to upper and lower faces of the padding assembly.

In another aspect, the tying apparatus includes a magnetic attraction device connected to the padding assembly. The magnetic attraction device is operable to provide magnetic attraction to keep the padding assembly in position on the vehicle roof.

In another aspect, the padding assembly includes two pads and a flexible connector connected the pads.

In another aspect, the flexible connector is made in one piece with the pads. The pads are formed on an upper face of the flexible connector and separated from each other by a gap.

In an alternative aspect, the flexible connector is not made in one piece with the pads. The pads are connected to an upper face of the flexible connector and separated from each other by a gap.

In another aspect, the tying apparatus includes two upper soft skins and a lower soft skin. Each of the upper soft skins is connected to an upper face of a corresponding one of the pads. The lower soft skin is connected to a lower face of the flexible connector.

In another aspect, the binding assembly includes a strap, a buckle and a handle. The strap is operable to form a loop. The buckle is operable to keep the strap in the form of the loop. The handle is operable to maneuver the buckle.

In another aspect, the binding assembly includes two soft pads connected to a middle section of the strap. An end of one of the soft pads is separated from an end of the remaining one of the soft pads by a gap.

Other objectives, advantages and features of the present invention will be apparent from the following description referring to the attached drawings.

BRIEF DESCRIPTION OF DRAWINGS

The present invention will be described via detailed illustration of three embodiments referring to the drawings wherein.

DETAILED DESCRIPTION OF EMBODIMENTS

Figure 1:
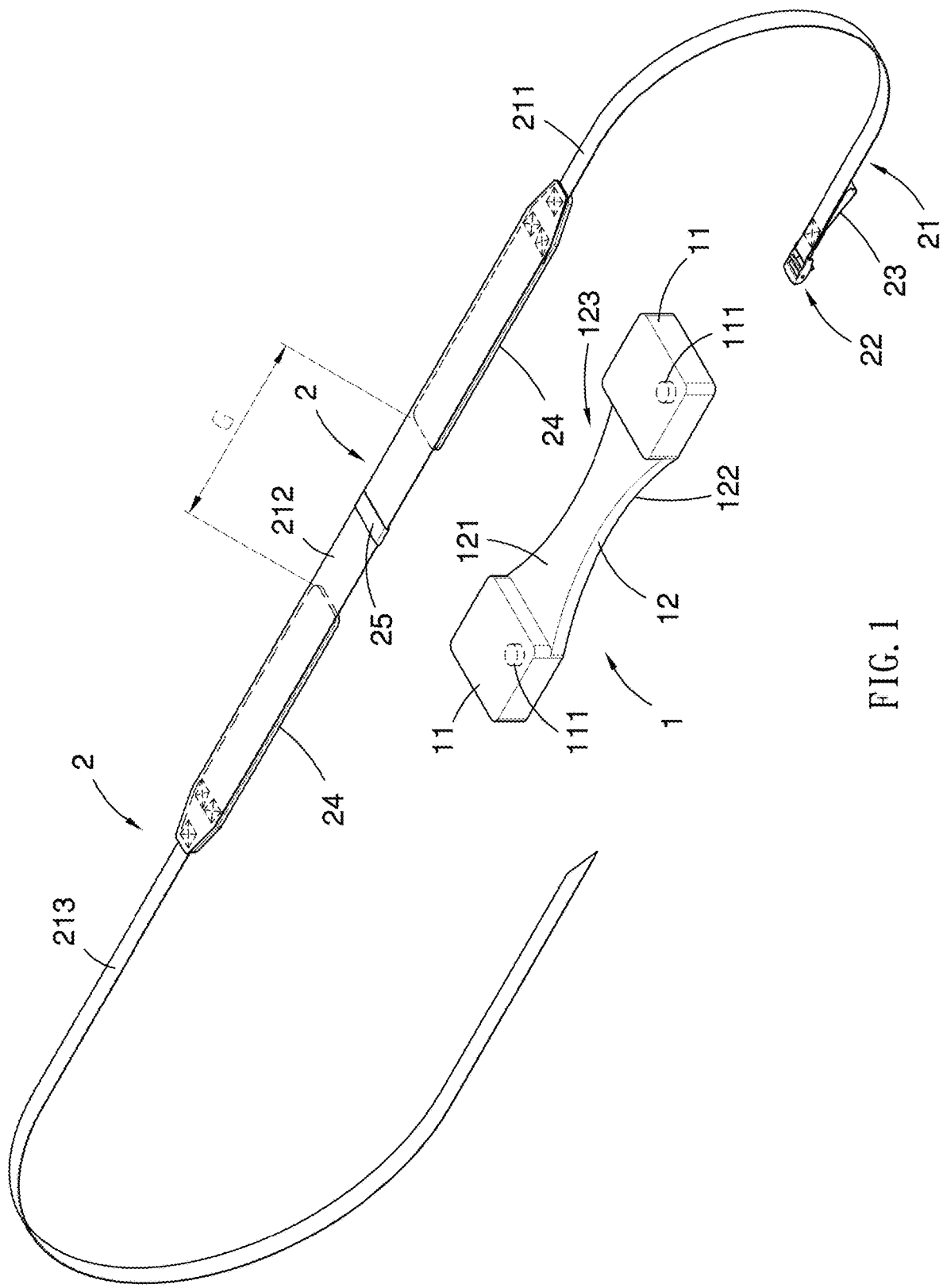
FIG. 1 is a perspective view of a tying apparatus according to the first embodiment of the present invention.
Figure 2:
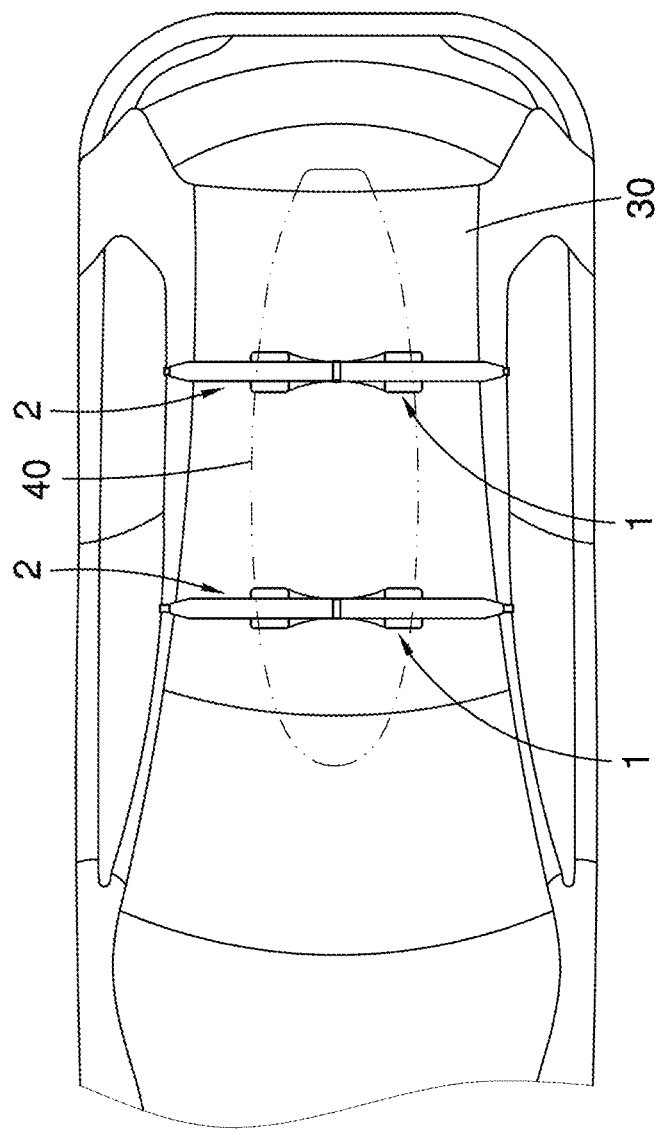
FIG. 2 is a top view of a vehicle carrying a sports board on the tying apparatus shown in FIG. 1.
Figure 3:
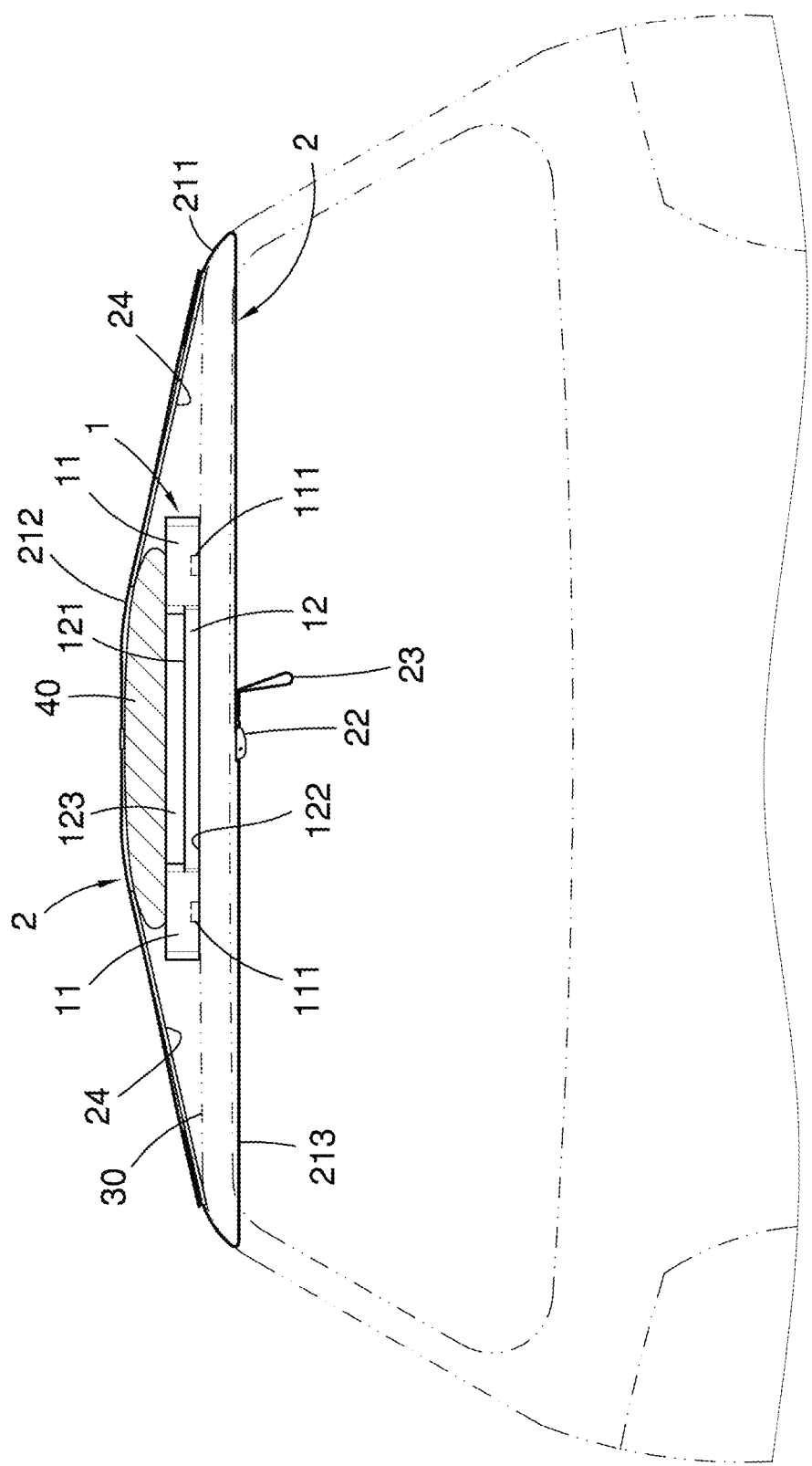
FIG. 3 is a partial, cross-sectional view of the vehicle, the sports board and the tying apparatus shown in FIG. 2.

Referring to FIG. 1, a tying apparatus includes a padding assembly 1 and a binding assembly 2 according to a first embodiment of the present invention. Referring to FIGS. 2 and 3, the typing apparatus is used to tie an object 40 to a vehicle roof 30. The object 40 can be but not limited to a sports board such as a surfboard, paddleboard used in stand up paddle ("SUP"), a ski, a snow led, a snow board, a grass board and sand board.

Some of the sports boards such as paddleboards and surfboards are large, and two tying apparatuses are needed to tie a paddleboard or a surfboard to the vehicle roof 30. In this case, the padding assemblies 1 of the tying apparatuses are located on a vehicle roof 30. An object 40 is located on the padding assemblies 1 of the tying apparatuses. The binding assembly 2 of each of the typing apparatuses is wound around the vehicle roof 30 and the object 40. Thus, the padding assembly 1 of each of the tying apparatuses is located between the vehicle roof 30 and the object 40 to prevent the object 40 from rubbing against the vehicle roof 30. The binding assembly 2 of each of the tying apparatuses tightly ties the object 40 to the vehicle roof 30 to firmly keep the object 40 on the vehicle roof 30 during transportation.

However, only one tying apparatus is needed to tie a small sports board to the vehicle roof 30. It is up to a user to use one tying apparatus or more.

The tying apparatus further includes a magnetic attraction device supported on the padding assembly 1. The magnetic attraction device is used to firmly keep the padding assembly 1 on vehicle roof 30 by magnetic attraction. Preferably, the magnetic attraction device includes two magnets 111. However, the magnetic attraction device can include one magnet 111 or any other amount of magnets 111. The magnets 111 are preferably neodymium magnet. Moreover, the magnetic attraction device can include magnetic powder spread in the padding assembly 1, or flexible magnetic strips connected to a lower face of the padding assembly 1. No matter what, the magnetic attraction device provides magnetic attraction to firmly keep the padding assembly 1 on the vehicle roof 30.

Preferably, referring to FIG. 1, the padding assembly 1 includes two pads 11 connected to a flexible connector 12. The flexible connector 12 can be bent or curved in compliance with the vehicle roof 30 so that the lower face of the padding assembly 1 is in contact with the vehicle roof 30 as tight as possible to maximize the friction between the padding assembly 1 and the vehicle roof 30, thereby keeping the padding assembly 1 in position relative to the vehicle roof 30.

Preferably, the padding assembly 1 is made of plastics or rubber in one piece. For example, the padding assembly 1 is made of a plastic foam material or a rubber foam material. More particularly, the padding assembly 1 can be made of commercially available PE, EVA, PU, PP, PVC, EVA, CR, SBR or NBR. Thus, the padding assembly 1 is light in weight, elastic and skid-proof.

Preferably, the flexible connector 12 is made in one piece with the pads 11 of a same foam material. The thickness of the flexible connector 12 is smaller than the thickness of the pads 11. The flexible connector 12 is formed with an upper face 121 and a lower face 122. The pads 11 are formed on the upper face 121 of the flexible connector 12 and separated from each other by a gap 123. Preferably, two magnets 111 are embedded in the flexible connector 12 near the lower face 122. Each of the magnets 111 is located below a corresponding one of the pads 11. Preferably, the breadth (or "width") of the flexible connector 12 gets larger towards two ends from a middle section of reduced breadth. The flexible connector 12 includes two arched edges opposite to each other.

Figure 4:
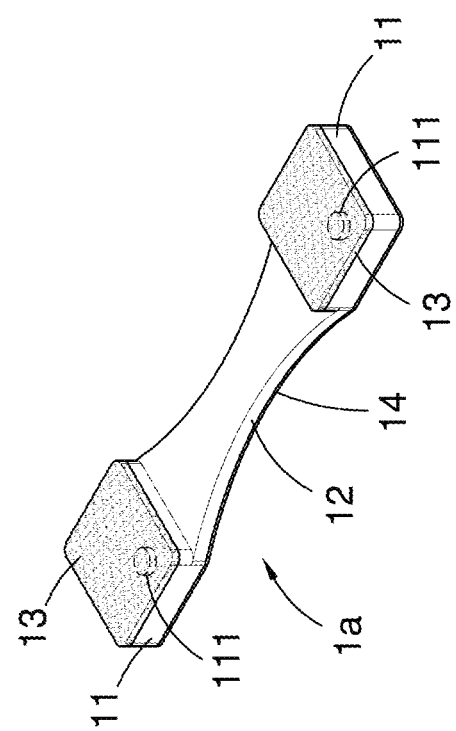
FIG. 4 is a perspective view of a skid-proof padding assembly of a tying apparatus according to the second embodiment of the present invention.

Referring to FIG. 4, there is shown a highly skid-proof padding assembly 1a according to a second embodiment of the present invention. The padding assembly 1a includes two soft skins 13 and a soft skin 14 in addition. Each of the soft skins 13 is connected to an upper face of a corresponding one of the pads 11. The soft skin 14 is connected to the lower face 122 of the flexible connector 12 so that the magnets 111 are covered by the soft skin 14. Preferably, the soft skins 13 and 14 are soft skins made of rubber such as chloroprene rubber ("CR" or "neoprene"), foam-like or not. However, the soft skins 13 and 14 can be made of other types of rubber or plastics. Preferably, the flexible connector 12 and the pads 11 are made of PE or PS in one piece.

Figure 5:
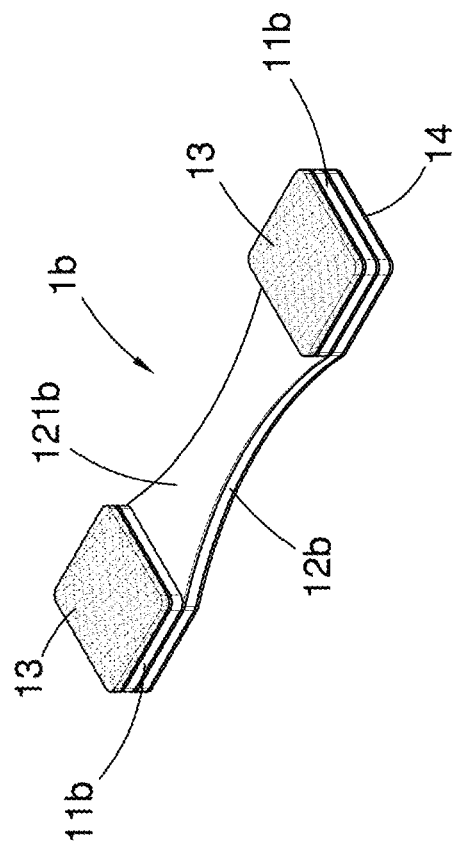
FIG. 5 is a perspective view of a skid-proof padding assembly of a tying apparatus according to the third embodiment of the present invention.
Figure 6:
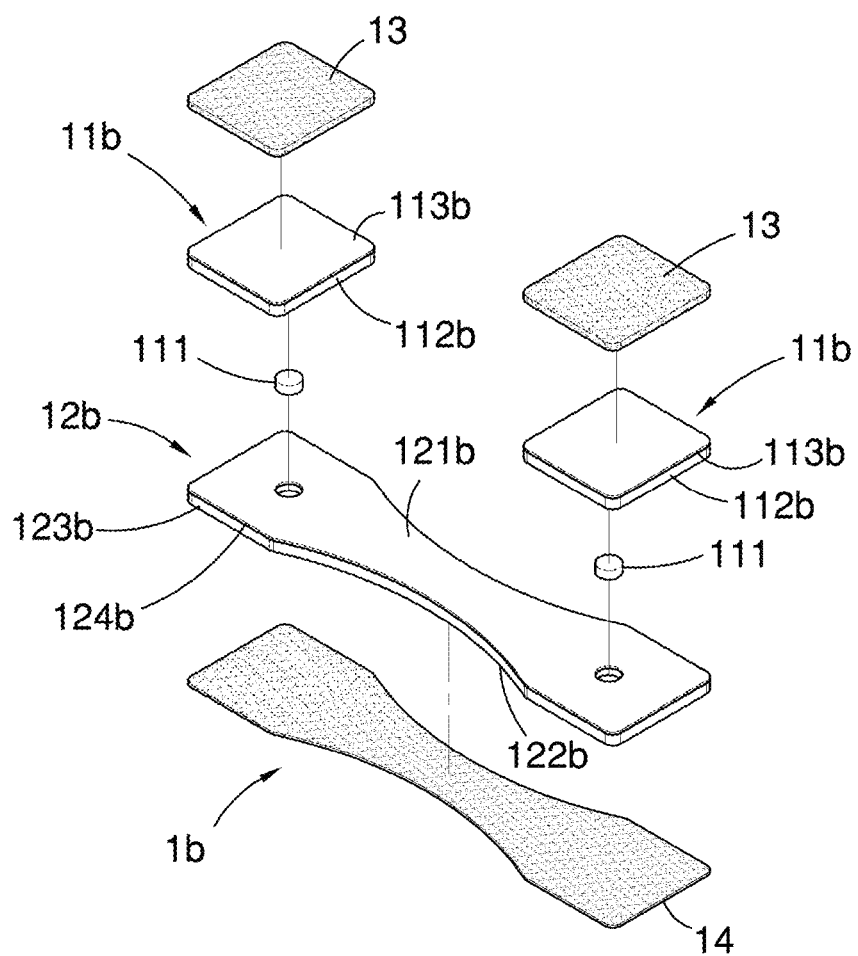
FIG. 6 is an exploded view of the skid-proof padding shown in FIG. 5.

Referring to FIGS. 5 and 6, there is shown a highly skid-proof padding assembly 1b according to a third embodiment of the present invention. The padding assembly 1b includes two pads 11b connected to a flexible connector 12b. The pads 11b and the flexible connector 12b are made of a foam material, but not in one piece. Particularly, the pads 11b are formed independent of the flexible connector 12b before the pads 11b are connected to an upper face 121b of the flexible connector 12b. The pads 11b are separated from each other by a gap. Foam skins such as PE foam skins are often left after the manufacturing sports boards. Such left-over foam skins can be connected to the pads 11b and the flexible connector 12b, respectively. A PE foam skin includes two PE foam layers of different thickness and density. Referring to FIG. 6, each of the pads 11b includes a thick PE foam layer 112b and a thin PE foam layer 113b. The density of the thick PE foam layer 112b is lower than the density of the thin PE foam layer 113b. The flexible connector 12b includes a thick PE foam layer 123b and a thin PE foam layer 124b. The density of the thick PE foam layer 123b is lower than the density of the thin PE foam layer 124b. Moreover, each of the upper and lower faces of the padding assembly 1b is covered by one soft skin or two. In specific, a soft skin 13 is connected to an upper face of each of the pads 11b. A soft skin 14 is connected to the lower face 122b of the flexible connector 12b so that the magnets 111 are covered by the soft skin 14.

The magnetic attraction device can be replaced with at least one sucker (or "suction pad"), hook-and-loop means, adhesive or any other proper means as long as it can keep the padding assembly in position on the vehicle roof 30.

Figure 7:
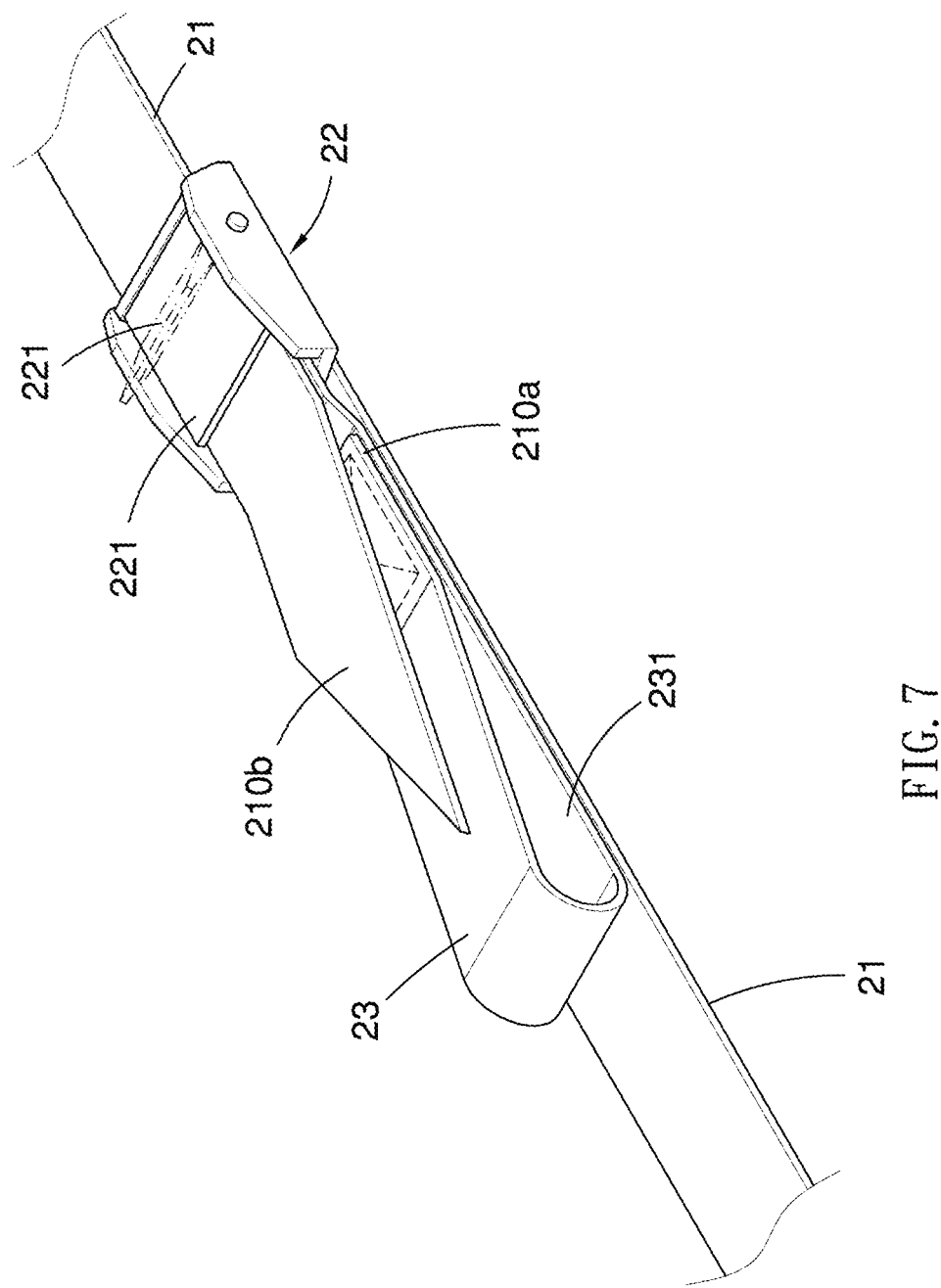
FIG. 7 is an enlarged view of a buckle and a strap of the tying apparatus shown in FIG. 1.

Referring to FIG. 1, the binding assembly 2 includes a strap 21 and a buckle 22. Referring to FIG. 3, the strap 21 is long enough to be turned into a loop around the vehicle roof 30. The buckle 22 is used to retain the loop made of the strap 21. Referring to FIG. 7, the buckle 22 includes a pivotal presser 221. The buckle 22 is connected to a rear end 210a of the strap 21. The strap 21 includes a front end 210b that can be moved throughout the buckle 22 before the presser 221 is pivoted down to press the strap 21. Thus, the strap 21 cannot be moved in an opposite direction and the front end 210b of the strap 21 cannot be disengaged from the buckle 22 until the presser 221 is pivoted up (as shown by phantom lines in FIG. 7). However, it should be noted that the buckle 22 is shown for example, not for restrictive purposes. The buckle 22 can be in another proper form than shown in the drawings. The strap 21 can be made of plastics or cloth.

The strap 21 is formed with a front section 211 near the front end 210b, a rear section 213 near the rear end 210a, and a middle section 212 between the front section 211 and the rear section 213. The front section 211 of the strap 21 can be locked by the buckle 22.

Referring to FIGS. 1 and 7, the binding assembly 2 further includes a handle 23 connected to the buckle 22. The handle 23 is operable by the user to pull the strap 21. That is, the handle 23 is used to facilitate the pulling of the strap 21. In specific, the handle 23 is made of the rear section 211 of the strap 21 near the rear end 210a. To make the handle 23, the rear end 210a of the strap 21 is moved throughout the buckle 22 in a direction. Then, the rear end 210a of the strap 21 is moved in an opposite direction so that the rear section 211 of the strap 21 is turned into a loop 231. Finally, the rear end 210a is connected to a region of the rear section 211 of the buckle 22 by sewing for example.

The belt 2 further includes two soft pads 24 connected to a lower face of the middle section 212 thereof by sewing, adhesion or any other proper means. The soft pads 24 are used for skid-proof purposes. Preferably, there is a gap G between an end of one of the soft pads 24 and an end of the remaining one of the soft pads 24. Preferably, each of the soft pads 24 is a soft skin made of rubber such as chloroprene rubber ("CR" or neoprene), foam-like or not. However, the soft pads 24 can be made of any other proper types of rubber or plastics. Moreover, the soft pads 24 can be replaced with a single soft pad (not shown). The length of such a single soft pad is identical to the sum of the lengths of the soft pads 24 plus the length of the gap G.

Referring to FIG. 1, the binding assembly 2 further includes a ring 25. The middle section 212 of the strap 21 is moved throughout the ring 25. The ring 25 can be provided with a trademark or a decorative pattern.

Figure 8:
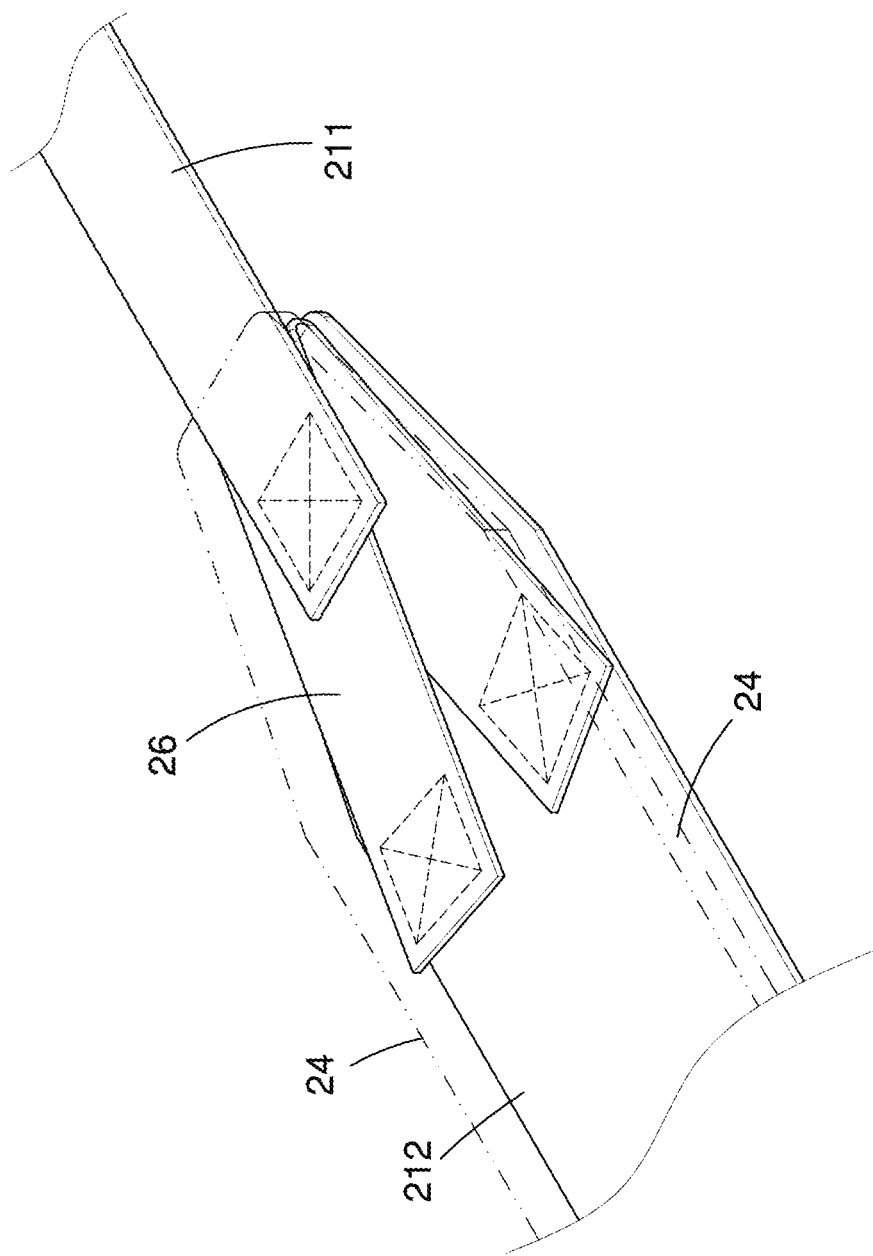
FIG. 8 is an enlarged, partial view of the strap of the tying apparatus shown in FIG. 1.

Referring to FIG. 8, the front section 211 of the strap 21 is connected to the middle section 212 by sewing. In specific, a string of cloth 26 is bent so that it looks like a "V." The V-shaped string of cloth 26 is overlapped with and connected to an end of the middle section 212 by sewing. Then, an end of the front section 211 is overlapped with and connected to the V-shaped string of cloth 26 by sewing. Thus, the sewing firmly connects the front section 211 to the middle section 212. Then, one of the soft pads 24 is overlapped with and connected to the middle section 212 by sewing. Thus, the end of the front section 211 and the V-shaped string of cloth 26 are sandwiched between the one of the soft pads 24 and the end of the middle section 212. The rear section 213 of the strap 21 is connected to the middle section 212 in a similar manner.

As discussed above, the tying apparatus can be used to tie the object 40 to the vehicle roof 30 in a convenient and reliable manner.

Furthermore, it should be noted that the binding assembly 2 can be used alone to tie an object, i.e., without the using the padding assembly 1. The padding assembly 1 can be used alone to support an object, i.e., without using the binding assembly 2.

The present invention has been described via the illustration of the embodiments. Those skilled in the art can derive variations from the embodiments without departing from the scope of the present invention. Therefore, the embodiments shall not limit the scope of the present invention defined in the claims.

The invention claimed is:

1. A tying apparatus comprising:
   a padding assembly located on a top surface of a vehicle roof and including two pads and a flexible connector connecting the pads, the flexible connector having an upper face and a lower face, the pads configured on the upper face of the flexible connector and separated from each other by a distance, wherein the flexible connector is made of foam material and can be bent in accordance with the top surface of the vehicle roof so that the entire lower face of the flexible connector is in contact with the top surface of the vehicle roof; and
   a binding assembly for tying an object supported on the padding assembly to the vehicle roof.

2. The tying apparatus according to claim 1, comprising a magnetic attraction device connected to the padding assembly, wherein the magnetic attraction device is operable to provide magnetic attraction to keep the padding assembly in position on the vehicle roof.

3. The tying apparatus according to claim 1, comprising two upper soft skins each of which is connected to an upper face of a corresponding one of the pads and a lower soft skin connected to the lower face of the flexible connector.

4. The tying apparatus according to claim 3, comprising a magnetic attraction device connected to the padding assembly, and the magnetic attraction device is operable to provide magnetic attraction to keep the padding assembly in position on the vehicle roof.

5. The tying apparatus according to claim 1, wherein the binding assembly comprises:
   a strap having a middle section, wherein a bottom surface of the middle section faces the padding assembly when the strap is operated to form a loop;
   a buckle operable to keep the strap in the form of the loop; and
   a handle operable to maneuver the buckle.

6. The tying apparatus according to claim 5, wherein the binding assembly comprises two soft pads connected to the bottom surface of the middle section of the strap, and an end of one of the soft pads is separated from an end of the remaining one of the soft pads by a gap, and
   wherein the ends of the soft pads are located between the middle section of the strap and the pads of the padding assembly when the strap is operated to form the loop.

7. The tying apparatus according to claim 1, wherein a thickness of the flexible connector is smaller than a thickness of the pads so that the pads are separated from each other by a gap.

8. The tying apparatus according to claim 7, wherein each of the pads includes a thick foam layer and a thin foam layer, and
   wherein a density of the thick foam layer is lower than a density of the thin foam layer.

9. The tying apparatus according to claim 8, wherein the flexible connector includes a thick foam layer and a thin foam layer,
   wherein the density of the thick foam layer of the flexible connector is lower than the density of the thin foam layer of the flexible connector, and
   wherein two upper soft skins each of which is connected to an upper face of a corresponding one of the pads and a lower soft skin connected to the lower face of the flexible connector.

10. The tying apparatus according to claim 7, wherein the flexible connector is made in one piece with the pads.

\* \* \* \* \*